United States Patent [19]

Bollyky

[11] 3,720,622

[45] March 13, 1973

[54] GENERATION OF LIGHT FROM THE DECOMPOSITION OF DIOXETANEONES IN THE PRESENCE OF A FLUORESCER

[75] Inventor: Laszlo Joseph Bollyky, Stamford, Conn.

[73] Assignee: American Cyanamid Company, Stamford, Conn.

[22] Filed: Jan. 2, 1970

[21] Appl. No.: 415

[52] U.S. Cl..............................252/188.3, 260/585.5
[51] Int. Cl..............................................C09k 3/00
[58] Field of Search.....252/188.3, 301.2; 260/585.5, 260/340.2

[56] References Cited

UNITED STATES PATENTS

| 2,608,520 | 8/1952 | Harmon | 260/585.5 |
| 2,627,477 | 2/1953 | Downey | 260/585.5 |

*Primary Examiner*—John D. Welsh
*Attorney*—Charles J. Fickey

[57] ABSTRACT

A bright chemiluminescent light emission is obtained when ketene or substituted ketenes such as diphenylketene are reacted with singlet oxygen or a precursor thereof such as triphenylphosphite-ozone complex in the presence of a fluorescer.

7 Claims, No Drawings

GENERATION OF LIGHT FROM THE DECOMPOSITION OF DIOXETANEONES IN THE PRESENCE OF A FLUORESCER

This invention relates to the generation of chemiluminescent visible light from the reaction of dioxetaneones and a fluorescer. Dioxetaneones can be made from many reactions such as the reaction of ketenes and singlet oxygen.

Singlet oxygen can emit very weak light itself or can produce a very weak light emission in the presence of rubrene fluorescer through energy transfer. It also produces an observable weak light emission of 9,10-bis(phenylethynyl)anthracene and of 9,10-diphenylanthracene, the fluorescers used in the chemiluminescent system of this invention. However, this light emission is very much weaker than the chemiluminescent light obtainable from the reaction of this invention.

I have unexpectedly discovered that ketenes react with singlet oxygen and that the reaction produces a bright chemiluminescent light emission in the presence of fluorescers in an inert medium such as methylene chloride.

It is therefore the object of this invention to generate chemiluminescent light from the reaction of ketenes or ketene precursors and singlet oxygen and a fluorescer.

A further object is to generate light from the reaction of ketenes and singlet oxygen precursors such as the triphenyl-phosphite-ozone complex and fluorescer.

These and other objects of the invention will become apparent as the description thereof proceeds.

The ketenes used for this reaction include the unsubstituted ketene and ketenes substituted by one or two groups such as described by the following general formula

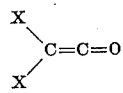

where X equals hydrogen, alkyl groups: such as methyl, ethyl, propyl, butyl, cyclobutyl, haloalkyl groups: such as trifluoromethyl, trichloromethyl, aryl groups: such as phenyl, naphthyl, dichlorophenyl, dimethoxyphenyl, dimethylphenyl, halide groups: such as chloride, fluoride, bromide and acyl groups: such as acetyl or as in cyclic ketene Y

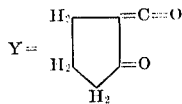

Ketene precursors are also effective. These ketene precursors include (1) dimers, trimers or other oligomers and polymers that on decomposition produce ketenes and (2) ketene acylals such as Z

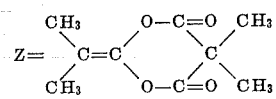

that under mildly basic conditions produce ketenes and (3) other ketene precursors described in Henri Ulrich, "Ketenes", p. 38–103 in "Cycloaddition Reactions of Heterocumulenes", Academic Press, New York, 1967. The term ketene as used herein includes both ketenes and ketene precursors.

Singlet oxygen can be prepared chemically from hydrogen peroxide in alkaline media with a number of re-agents such as hypochlorites, bromine, nitriles, organic peracids (See C. S. Foote, Accounts Chem. Res. 1 104 (1968) E. McKeown, W. A. Waters J. Chem. Soc. B, 1040 (1966)) or in an electrodless radio frequency field from molecular oxygen (See E. J. Corey and W. C. Taylor J. Am. Chem. Soc. 86, 3881 (1964)). The thermal decomposition of such singlet oxygen precursors as triphenyl phosphite-ozone complex (See R. W. Murray and M. L. Kaplan J. Am. Chem. Soc. 90 537,4161 (1968)), and of endo-peroxides also produces singlet oxygen (See H. H. Wasserman and J. R. Scheffer J. Am. Chem. Soc. 89 3073 (1967)). While only typical singlet oxygen sources are listed hereinabove, the person skilled in the art is fully aware of the fact that this invention is not so restricted, and other sources of singlet oxygen are also contemplated for use herein. Therefore, the term singlet oxygen as used herein includes singlet oxygen and its precursors.

The fluorescent compounds contemplated herein are numerous; and they may be defined broadly as those which do not preferentially react on contact with the singlet oxygen or its precursor employed in this invention, such as triphenylphosphite-ozone complex; likewise, they do not readily react on contact with the ketene.

Typical suitable fluorescent compounds for use in the present invention are those which have a spectral emission falling between 330 millimicrons and 750 millimicrons and which are at least partially soluble in any of the diluents discussed below, if such diluent is employed. Among these are the conjugated polycyclic aromatic compounds having at least three fused rings, such as: anthracene, substituted anthracene, benzanthracene, phenanthrene, substituted phenanthrene, naphthacene, substituted naphthacene, pentacene, substituted pentacene, perylene, substituted perylene, and the like.

Substituents for all of these include phenyl, lower alkyl, chlorine, bromine, cyano, alkoxy ($C_1$–$C_{16}$), and other like substituents which do not interfere with the light-generating reaction contemplated herein.

Numerous other fluorescent compounds having the properties given hereinabove are well known in the art. Many of these are fully described in "Fluorescence and Phosphorescence" by Peter Pringsheim, Interscience Publishers, Inc., New York, N.Y., 1969. Other fluorescers are described in "The Color Index", Second Edition, Volume 2, The American Association of Textile Chemists and Colorists, 1956, pp. 2907–2923. While only typical fluorescent compounds are listed hereinabove, the person skilled in the art is fully aware of the fact that this invention is not so restricted, and that numerous other fluorescent compounds having similar properties are contemplated for use herein.

The preferred fluorescers are 9,10-bis(phenylethynyl)anthracene, 9,10-diphenylanthracene, and perylene.

The fluorescer concentration in the reacting system is broadly 0.0002 to 0.03 molar, preferably 0.001 to 0.015 molar.

The solvents for the chemiluminescent components are organic solvents that are inert to ketenes and to singlet oxygen and singlet oxygen precursors or reagents. Several solvent types are suitable:

1. Hydrocarbons, i.e. hexane, octane, cyclohexane.
2. Halocarbons: methylene chloride, carbon tetrachloride, dichlorodifluoromethane, hexachloroethane, chloroform, tetrachlorotetrafluoropropane.
3. Aromatic hydrocarbons: benzene, toluene, ethylbenzen, butylbenzene, chlorobenzene, o-dichlorobenzene.
4. Esters: dimethyl phthalate, dibutyl phthalate, ethyl benzoate, triacetin.

The reaction of ketenes (I) and singlet oxygen (II) produces a dioxetaneone (III) as shown by Equation 1. When the dioxetaneone intermediate, III, deomposes in the presence of a fluorescer (Flr), the fluorescer is excited to its singlet excited state (Equation 2) which subsequently emits light (Equation 3). Thus, chemiluminescent light emission is produced. The formation of a dioxetaneone intermediate is evident from the products of the reaction which, for example, are benzophenone and carbon dioxide from the reaction of diphenyl ketene and singlet oxygen.

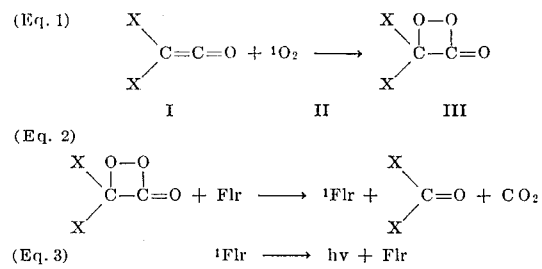

Since dioxetaneones from the reaction of ketene with singlet oxygen produce chemiluminescent light emission during decomposition in the presence of a fluorescer, it is clear that dioxetaneones produced by any other reaction must also be capable of light production in the presence of a fluorescer. Thus, this invention broadly includes the generation of light by the decomposition of dioxetaneones in the presence of a fluorescer and is not limited to any specific process for preparing dioxetaneones. Dioxetaneones are shown by the following general formula:

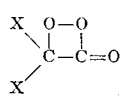

where X equals hydrogen, alkyl groups: such as methyl, ethyl, propyl, butyl, cyclobutyl, haloalkyl groups: such as trifluoromethyl, trichloromethyl, aryl groups: such as phenyl, naphthyl, dichlorophenyl, dimethoxyphenyl, dimethylphenyl, halide groups: such as chloride, fluoride, bromide and acyl groups: such as acetyl, or as in cyclic dioxetaneone D

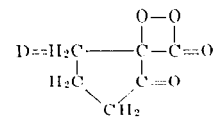

Preparative reactions for producing dioxetaneones include the following:

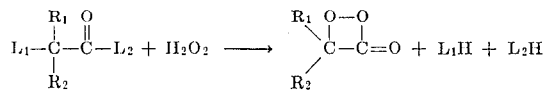

where
$L_1$ = a leaving group such as a) halide e.g. chloride, bromide, iodide, or a tosylate, e.g. $O-SO_2C_6H_5$. b) aryloxy group 2,4,6-trichlorophenyloxy, and carboxy-trichloro-phenyloxy, c) alkoxy e.g. methoxy trifluoromethoxy, d) heteroaryloxy, e.g. pyridonyl, methoxy pyridonyl, chloropyridonyl, $L_2 = L_1$ or an acyl group e.g. acetyl, benzoyl, and where $R_1 = R_2$ = hydrogen, alkyl, aryl, alkoxy, and halogen.

EXAMPLE I

A bright blue chemiluminescent light emission occurs when a saturated solution of ketene ($H_2C=C=O$) and 9,10-diphenylanthracene in methylene chloride is mixed with a 10 percent solution of singlet oxygen precursor, triphenylphosphite-ozone complex $[(C_6H_5O)_3PO_3]$ in methylene chloride maintained at $-70°C$. and the mixture is allowed to warm to room temperature. All three components, ketene, fluorescer and singlet oxygen are required to produce bright visible light emission.

EXAMPLE II

A bright green chemiluminescent light emission occurs when a saturated solution of ketene ($H_2C=C=O$) and 9,10-bis(phenylethynyl)anthracene in methylene chloride is mixed with a 10 percent solution of singlet oxygen precursor triphenyl-phosphite-ozone complex $[(C_6H_5O)_3PO_3]$ in methylene chloride maintained at $-70°C$. and the mixture is allowed to warm to room temperature. All three components, ketene, fluorescer and singlet oxygen are required to produce bright visible light emission.

EXAMPLE III

A bright blue chemiluminescent light emission occurs when a solution of 0.3 g. diphenylketene $[(C_6H_5)_2C=C=O]$ and 2 mg. 9,10-diphenylanthracene in 20 ml methylene chloride is mixed with 5 ml of a 10 percent solution of singlet oxygen precursor, triphenylphosphite-ozone complex $[(C_6H_5O)_3PO_3]$ in methylene chloride at $-70°C$. and the mixture is allowed to warm to room temperature. All three components, ketene, fluorescer and singlet oxygen are required to produce bright visible light emission.

EXAMPLE IV

A bright green chemiluminescent light emission occurs when a solution of 0.3 g. diphenylketene [$(C_6H_5)_2C=C=O$] and 2 mg. 9,10-bis(phenylethynyl)anthracene in 20 ml methylene chloride is mixed with 5 ml of a 10 percent solution of singlet oxygen precursor, triphenylphosphite-ozone complex [$(C_6H_5O)_3PO_3$] in methylene chloride at −70°C. and the mixture is allowed to warm to room temperature. All three components, ketene, fluorescer and singlet oxygen are required to produce bright visible light emission.

EXAMPLE V

A weak chemiluminescent light emission occurs when a solution of 0.5 g. diphenylketene glycolacetal and 2 mg. 9,10-bis(phenylethynyl)anthracene in 20 ml methylene chloride is mixed with 5 ml of a 10 percent solution of singlet oxygen precursor, triphenylphosphite-ozone complex [$(C_6H_5)_3PO_3$] in methylene chloride at −70°C. and the mixture is allowed to warm to room temperature.

EXAMPLE VI

One ml 1.5 molar diphenylketene solution in methylene chloride is mixed with 9 ml 0.31 molar triphenylphosphite-ozone complex solution in methylene chloride kept at −70°C. The mixture is allowed to warm to room temperature and the products are analyzed by a Perkin Elmer Model 521 Infrared spectrometer. The products obtained are carbon dioxide (2340 cm$^{-1}$) benzophenone 40 percent (1660 cm$^{-1}$) and diphenylacetic acid 60 percent (1750 cm$^{-1}$) a hydrolysis product due to the traces of moisture absorbed during the experiment.

EXAMPLE VII

A medium to weak chemiluminescent light emission was obtained when approximately 3 mg. chloroacetylchloride was added to a 5 ml slurry of 0.2 g KOH 1 mg. 9,10-diphenylanthracene, and 0.2 ml $H_2O_2$ (98 percent) in dimethoxy ethane at 60°C.

EXAMPLE VIII

A medium to weak chemiluminescent light emission was obtained when approximately 3 mg. dichloroacetyl-chloride was added to a 5 ml slurry of 0.2 g KOH, 1 mg. 9,10-diphenyl-anthracene, and 0.2 ml $H_2O_2$ (98 percent) in dimethoxyethane at 60°C.

EXAMPLE IX

A weak chemiluminescent light emission was observed for about 20 minutes when approximately 3 mg. 2,4,6-trichlorophenyl dimethoxy-acetate (Prepared by a modified procedure of H. Gross and J. Freiberg Ger. East Patent 52360) was added to a 5 ml slurry of 0.2 g KOH, 1 mg. 9,10-bisphenylethynylanthracene 0.2 ml $H_2O_2$ (98 percent) in diethoxy diethyl ether at 25°C.

I claim:

1. A chemiluminescent light composition adapted to be reacted with singlet oxygen or a precursor thereof to produce chemiluminescent light, containing the reactants (1) A) a ketene of the general formula

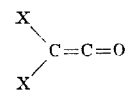

where X equals hydrogen, alkyl, haloalkyl, aryl, halide and acyl, or B) a ketene precursor that is capable of producing a ketene or a ketene acetal; (2) an organic fluorescent compound, and (3) an organic solvent for said reactants, said solvent being inert to said ketene or ketene precursor, said reactants being present in such ratios as to obtain visible chemiluminescent light upon reaction.

2. A composition of claim 1 where the ketene is selected from the group consisting of unsubstituted ketene, diphenylketene, and bis(trifluoromethyl)ketene.

3. A composition of claim 1 where the ketene precursor is dimethylketene dimethylmaleic acylal

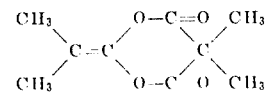

4. A composition of claim 1 where the singlet oxygen precursor is a triphenylphosphite-ozone complex.

5. A composition of claim 1 where the singlet oxygen precursor is selected from the group consisting of rubrene endoperoxide, 1,4-dimethoxy 9,10-diphenylanthracene and endoperoxide.

6. A process for producing visible light which is, reacting the reactants, a ketene precursor, a singlet oxygen precursor and an organic fluorescent compound in an organic solvent for said reactants, said reactants being present in such ratios as to produce visible light.

7. A two component chemiluminescent lighting system wherein the first component comprises a ketene and an organic fluorescent compound in a halogenated hydrocarbon solvent, and the second component comprises a singlet oxygen precursor in a halogenated hydrocarbon solvent.

* * * * *